United States Patent [19]

Heath

[11] 4,198,214

[45] Apr. 15, 1980

[54] METHOD AND APPARATUS FOR HEATING A SEPARATOR

[76] Inventor: Rodney T. Heath, 4901 E. Main St., Farmington, N. Mex. 87401

[21] Appl. No.: 3,922

[22] Filed: Jan. 16, 1979

[51] Int. Cl.$^2$ .............................................. B01D 19/00
[52] U.S. Cl. ............................................ 55/20; 55/45; 55/160; 55/175
[58] Field of Search ................ 55/20, 32, 45, 160, 55/163, 175, 217

[56] References Cited

U.S. PATENT DOCUMENTS

| | | |
|---|---|---|
| 3,025,928 | 3/1962 | Heath ........................................ 55/20 |
| 3,119,674 | 1/1964 | Glasgow et al. .................... 55/32 X |
| 3,193,990 | 7/1965 | Smith ................................... 55/32 X |
| 3,205,640 | 9/1965 | Smith ...................................... 55/32 |
| 3,318,071 | 5/1967 | Sinex ...................................... 55/32 |

*Primary Examiner*—Thomas G. Wyse
*Assistant Examiner*—Richard W. Burks
*Attorney, Agent, or Firm*—Richard D. Law

[57] ABSTRACT

An oil and gas separator having an internal heating coil for solution from a heater, and a thermostat controlled three way valve for either injecting supply gas into the solution from the heater, and or vent gas from the coil to the heater's burner depending on the temperature in the separator.

8 Claims, 2 Drawing Figures

METHOD AND APPARATUS FOR HEATING A SEPARATOR

This invention relates to apparatus of the type to heat a well liquid effluent prior to separating procedures for production of natural gas, and its liquid effluent. The well liquid effluent is normally an emulsion and is heated for the separation of the components.

A hydrocarbon well normally produces gaseous hydrocarbons and liquid hydrocarbons containing water. It often is desirable to separate the well stream into gas, hydrocarbon liquids, and water for commercial applicability. Heating the liquid effluent aids separation of the components and prevents freezing of the water.

OBJECTS AND ADVANTAGES OF THE INVENTION

Included among the objects and advantages of the invention is to provide an improved heating system for well effluent.

Another object of the invention is to provide a system where the gas used for temperature control of the effluent is not wasted by venting to the atmosphere. Any vented control gas is consumed in the burner of the heater.

Yet another object of the invention is to provide a method of heating well effluent in a separator having a heating coil supplied with heating solution, injecting supply gas into the heating liquid in the heating coil, and passing gas from the heating coil to burner as the temperature of solution heats and cools from a desired temperature in the effluent.

Another object of the invention is to provide a thermostatically controlled heating coil for a well effluent separator.

These and other objects of the invention may be ascertained by referring to the following description and appended illustrations.

GENERAL DESCRIPTION OF THE DRAWINGS

SPECIFIC DESCRIPTION OF THE DRAWINGS

Figure 1:
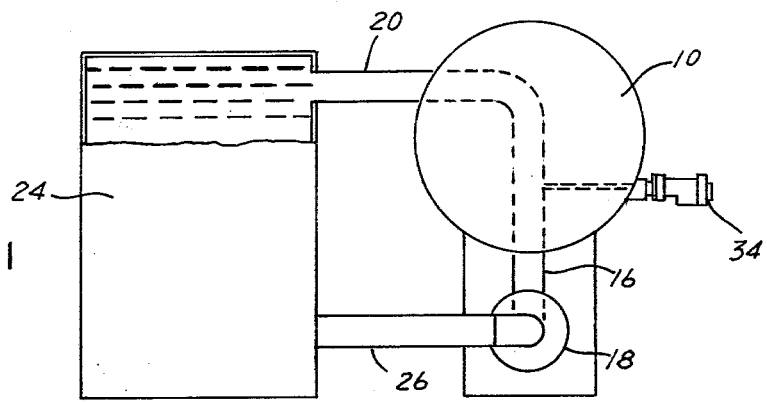
FIG. 1 is an end elevation, partially cut away, of a separator and a heater, according to the invention.
Figure 2:
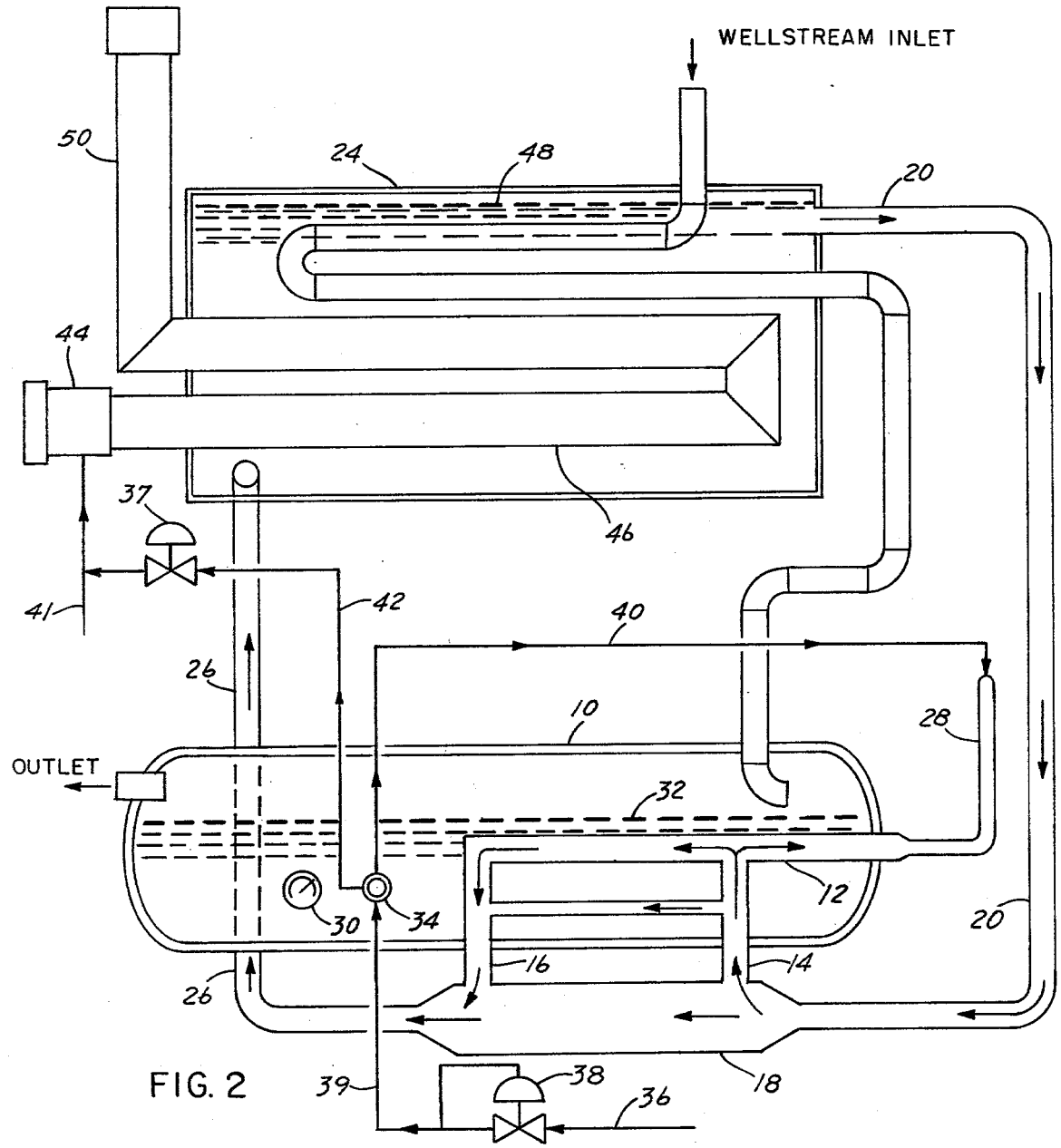
FIG. 2 is a sectional, schematic view of a heater tank for circulating heating fluids.

In the device selected for illustrations, the separator is schematically shown to more clearly set forth the elements of the invention. The separator is shown as a tank, however, it may be a known separator for the oil and gas well industry, for example, a separator shown in my U.S. Pat. No. 3,025,928 issued Mar. 20, 1962, among others. A separator for the desired operation must include an inlet and several outlets, at least one for liquid (sometimes several liquid outlets) and one for gas. Most such separtors have internal liquid separators, as water from oil, etc.

A separator tank 10, shown as a dished head tank, has a heating coil 12 mounted therein, secured in position to heat well effluent therein. The coil 12 has a solution inlet 14 and a solution outlet 16. A manifold 18 is connected to line 20 from a solution heater 24. The heating solution is maintained at atmospheric pressure so that a low pressure gas supply may be used in the system. The coil 12 inlet 14 is connected to one end of the manifold and the coil outlet 16 is connected to the opposite end of the manifold. The manifold 18 is substantially larger in diameter than the lines 20 and 26, to reduce the solution velocity in the line. A stand pipe 28 is connected into the coil 12, and it has a sufficient height to contain the solution in the coil at the pressure therein.

A thermometer 30 is mounted through the tank wall, with the dial visable from the exterior, but the sending bulb of the thermometer is positioned to be completely submerged in the fluid 32 in the tank. A thermostatically controlled three way valve 34 is mounted with its control exterior of the tank, for adjustment, and its sending unit completely submerged in the liquid in the tank. Such valves are commercially available units arranged with adjustments in the temperature range desired and with desired operating characteristics. Supply gas from a line 36 (usually from the well being treated) passes a pressure control valve 38 into line 39 which is connected to one side of the three way valve 34. A gas line 40 is connected to another port of the three way valve and its other end is connected with the stand pipe 28. A burner gas supply line 42 is connected to the third port of the three way valve 34 and through a pressure control valve 37 to burner 44 mounted in a firetube 46 secured in the heater tank 24. The firetube 46 is arranged to be maintained completely submerged in the heating solution 48 in the tank 24. A stack 50, connected to the outlet of the firetube 46 vents stack gases from the burner 44. A line 41 connected into the burner gas supply line permits venting of gas or adding gas as desired.

In the use of the heating unit of the invention, the heater tank 24 is filled with a glycol-water solution. The burner is fed gas and ignited to heat the glycol-water heating solution. As this heating solution is heated, a thermosyphon effect commences circulation of the solution through pipe 18 by the heated solution exhausting into line 20, from the top of the heating tank, through the manifold and coil. The thermostat on the three way valve is set to the temperature desired in the effluent in the separator. As the thermostat calls for more heat to the effluent, the valve port to the gas supply line is closed so that gas line 40 is communicating with gas line 42. Trapped gas in the coil is vented out through the stand pipe 28 into line 40 and to the burner via line 42. This, also, permits the coil to fill with heating solution. As the heating solution rises in the coil, the effluent is heated toward the desired temperature. When the desired temperature is reached, the three way valve cycles opening communication between the gas supply line 39 to line 40 so that gas at ounces of pressure is charged into the heating coil 12 through the stand pipe 28, and, of course, line 42 is closed. By injecting gas into coil 12, heating solution is forced out of the coil. When the effluent in the separator cools below the desired temperature, the three way valve cycles to close the supply gas line 39 and open communication between lines 40 and 42 venting gas from the coil to the burner, repeating the process of maintaining the effluent at the desired temperature.

The structures of the invention may be skid mounted, as is common in the art, and prepared for delivery to the field ready for use. This reduces the requirement of prepared foundations for the units and permits ready removal to other sites. The control components are stock items which are easily and readily replaced if damaged.

It will be understood that certain features and subcombinations are of utility for other purposes and may be employed without reference to other features. The claims therefore, contemplate such changes that are within their scope.

What is claimed is:

1. A method of controlling the heating of a separator for a hydrocarbon well production, in which a separator tank is arranged to contain liquid well effluent, comprising:
   (a) providing a supply of heating solution having a gas burning heater, and having an elevated heated solution outlet and a lower return inlet for cooled solution;
   (b) forming a heat exchange coil through the separator tank for passing heated solution from the upper outlet or supply of heating solution to the lower return inlet in a thermosyphon flow;
   (c) supplying low pressure gas controlled by a three-way valve to the coil in the separator tank with heating solution when the temperature of the effluent is above a predetermined temperature; and,
   (d) supplying gas from the coil to the gas burning heater when the temperature of the effluent is less than desired temperture.

2. The method of claim 1, wherein the three way valve is controlled by a thermostat in the effluent in the separator.

3. The method of claim 1, wherein the gas supply is in the pressure range of from 10 to 30 ounces per square inch.

4. A heating system for a well effluent separator having a heating solution coil; the combination of:
   (a) separate heating solution supply means having a gas fired burner heat exchanger, and having an upper heated solution outlet and a lower cooled solution return inlet;
   (b) manifold means connecting said solution outlet and said solution inlet on said heating solution supply means;
   (c) heating solution coil inlet and outlet connections to said manifold means for circulating heated solution through the heating solution coil;
   (e) a coil gas line connected to the heating solution coil;
   (f) a burner gas line connected to said gas fired burner; and,
   (g) three way valve means interconnecting said supply gas, coil gas and burner gas, whereby supply gas is connected to said coil gas line when said burner gas line is closed, and said coil gas line is connected to said burner gas line when said supply gas line is closed.

5. A heating system according to claim 4, wherein said three way valve is thermostatically controlled, and is arranged to operate at a predetermined temperature.

6. A heating system according to claim 4 wherein said manifold is of a greater diameter than said upper outlet and said lower return inlet.

7. A heating system according to claim 4, wherein said coil gas line includes standard pipe means from the heating solution coil.

8. A heating system according to claim 4, wherein said separate heating solution supply means includes a closed tank arranged for operation at about atmospheric pressure.

* * * * *